United States Patent [19]
Peter

[11] Patent Number: 6,145,866
[45] Date of Patent: Nov. 14, 2000

[54] HITCH PIN WITH LOCKING LEVER

[75] Inventor: Jeffrey Peter, Hicksville, Ohio

[73] Assignee: LockeasE Corporation, Hicksville, Ohio

[21] Appl. No.: 09/313,096

[22] Filed: May 17, 1999

[51] Int. Cl.$^7$ ................................................ B60D 1/02
[52] U.S. Cl. ........................................ 280/515; 403/325
[58] Field of Search ................................ 403/322.4, 325; 280/515, 504, 508, 507; 213/188

[56] References Cited

U.S. PATENT DOCUMENTS

| | | | |
|---|---|---|---|
| 2,454,856 | 11/1948 | Bible | 280/515 |
| 2,682,414 | 6/1954 | Richardson . | |
| 3,011,801 | 12/1961 | Neumann . | |
| 3,865,407 | 2/1975 | Klassen | 280/515 |
| 4,087,112 | 5/1978 | Lee, Jr. | 280/515 |
| 4,555,125 | 11/1985 | Goodlove | 280/515 |

FOREIGN PATENT DOCUMENTS

| | | | |
|---|---|---|---|
| 219985 | 7/1961 | Australia | 280/515 |
| 103279 | 12/1965 | Germany | 280/515 |

OTHER PUBLICATIONS

Declaration of Jeffrey Peter and Exhibits 1–6, Undated.

*Primary Examiner*—Paul N. Dickson
*Assistant Examiner*—Avraham H. Lerner
*Attorney, Agent, or Firm*—Baker & Daniels

[57] ABSTRACT

A hitch pin for connecting a drawn vehicle to a towing vehicle. The hitch pin includes a pin having a lower end and a transverse collar near its upper end, a handle mounting member extending upwardly at the upper end, and a handle pivotally connecting to the handle mounting member at an axis. The handle includes a pivot portion having a locking lever biased from pivoting downwardly and a latch portion. A first embodiment of the present invention includes the handle mounting member having two opposing flanges with flat inner surfaces and the pivot portion having flat sides such that pivot portion pivotally connects to the mounting member with the sides respectively facing the inner surfaces. A second embodiment thereof includes the handle mounting member having flat sides and the pivot portion having two opposing flanges with flat inner surfaces such that pivot portion pivotally connects to the mounting member with sides respectively facing the inner surfaces. When the handle connects to the handle mounting member, the locking lever engages a notch formed on the handle mounting member and the latch portion engages the lower end of the pin, defining a locked position of the hitch pin. When pressure is applied downwardly against the locking lever, the locking lever pivots downwardly such that it clears the notch, disengaging the latch portion from the lower end and allowing pivotal movement of the handle about the axis.

21 Claims, 3 Drawing Sheets

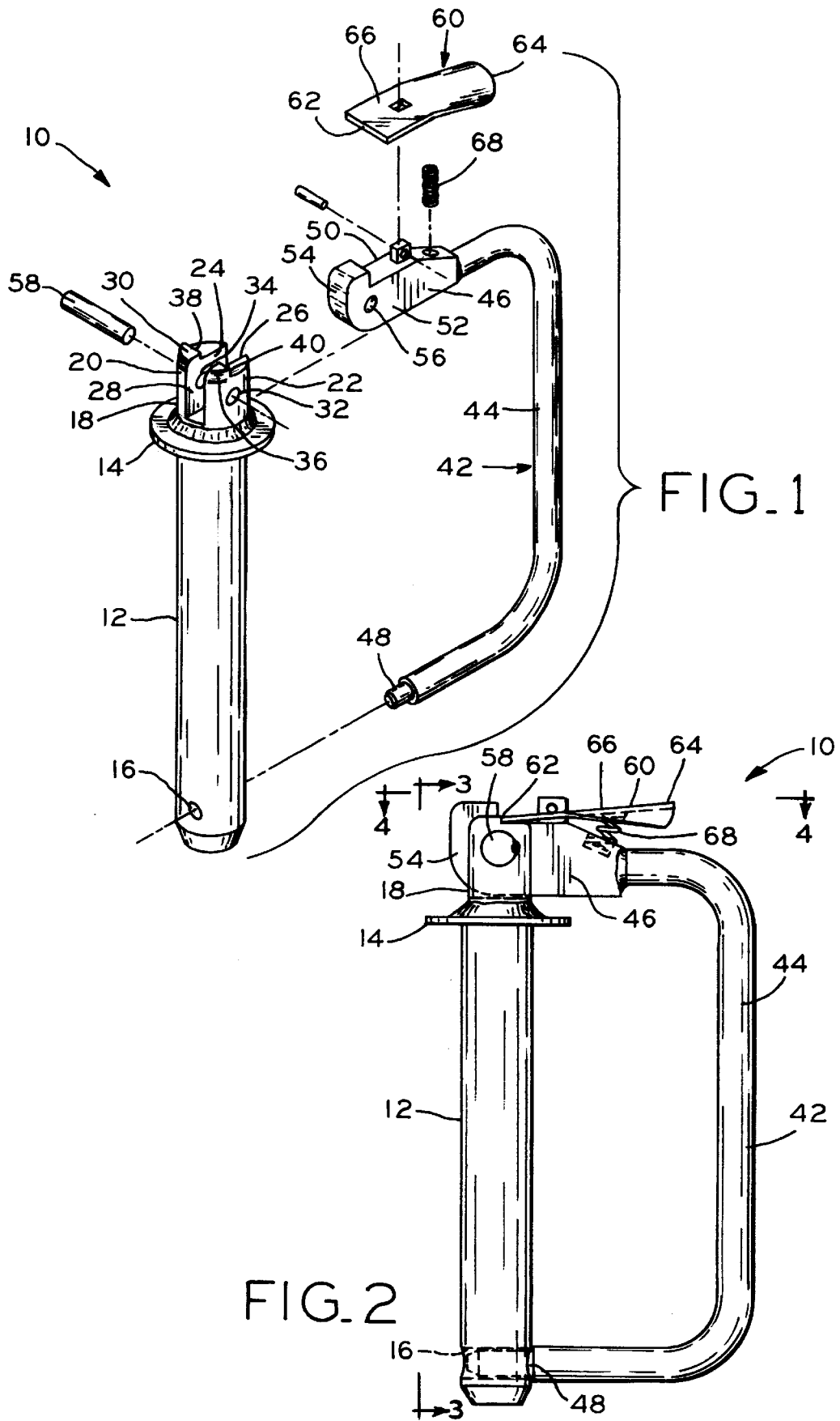

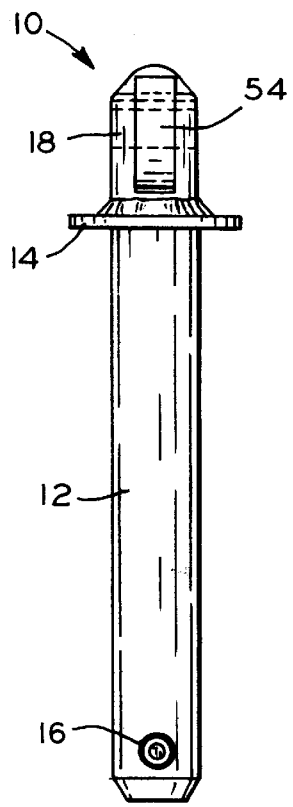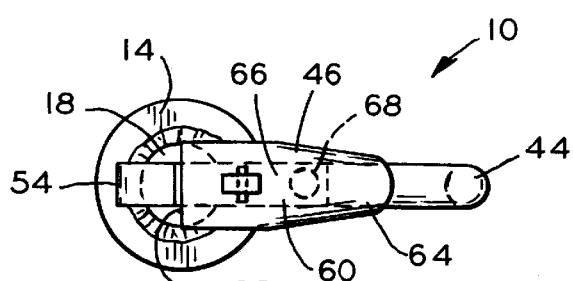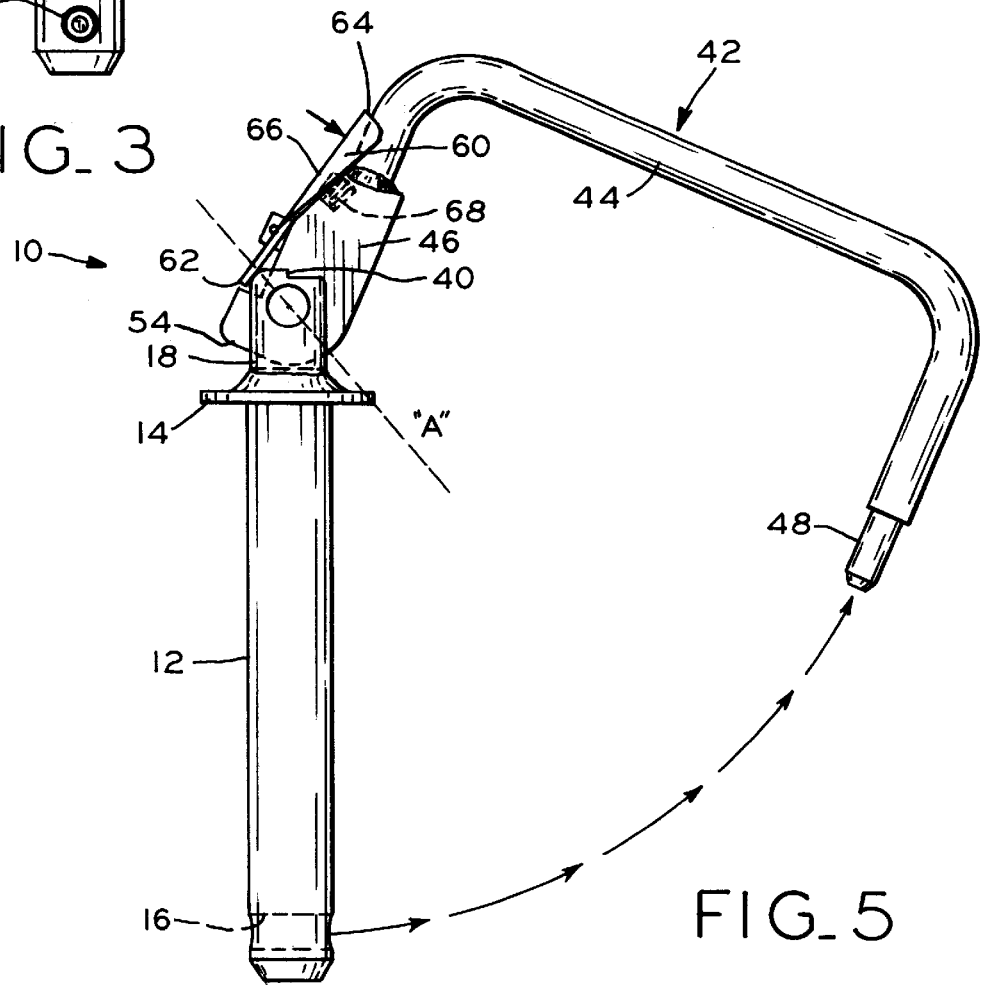

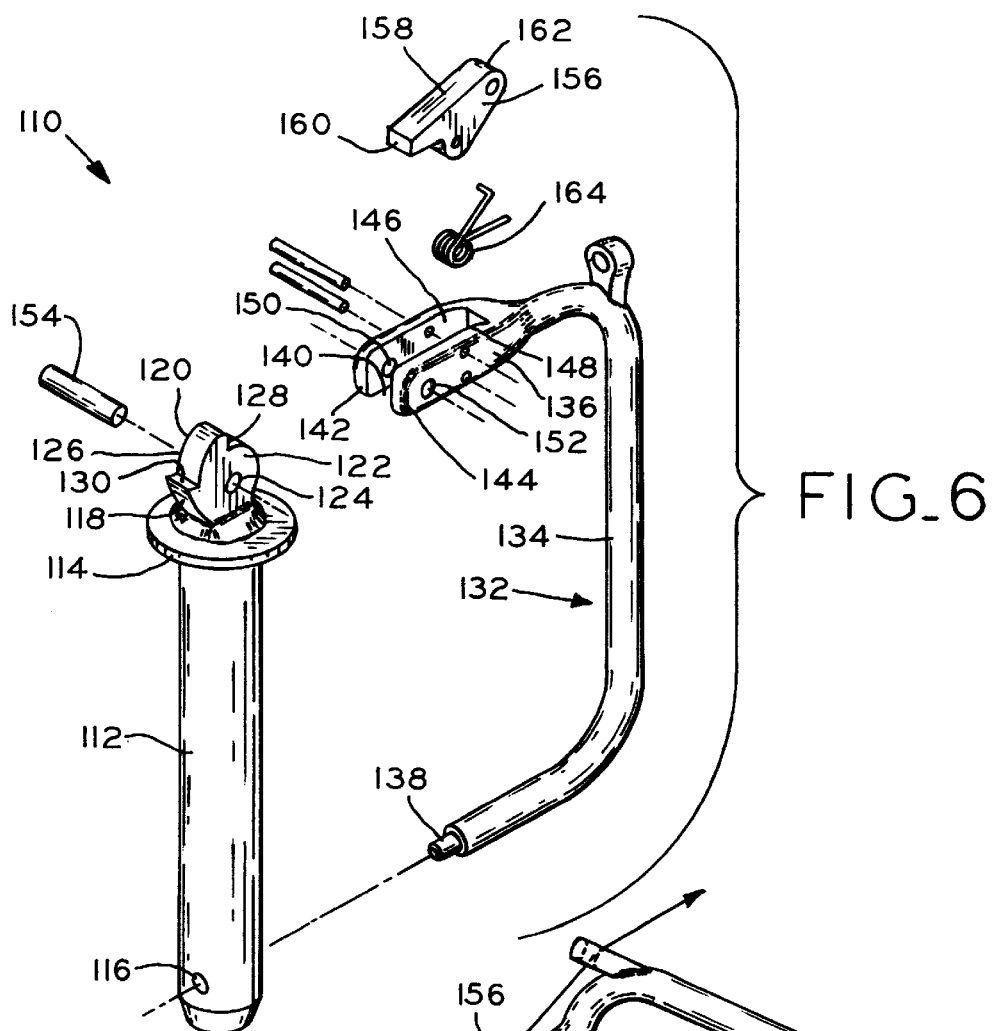
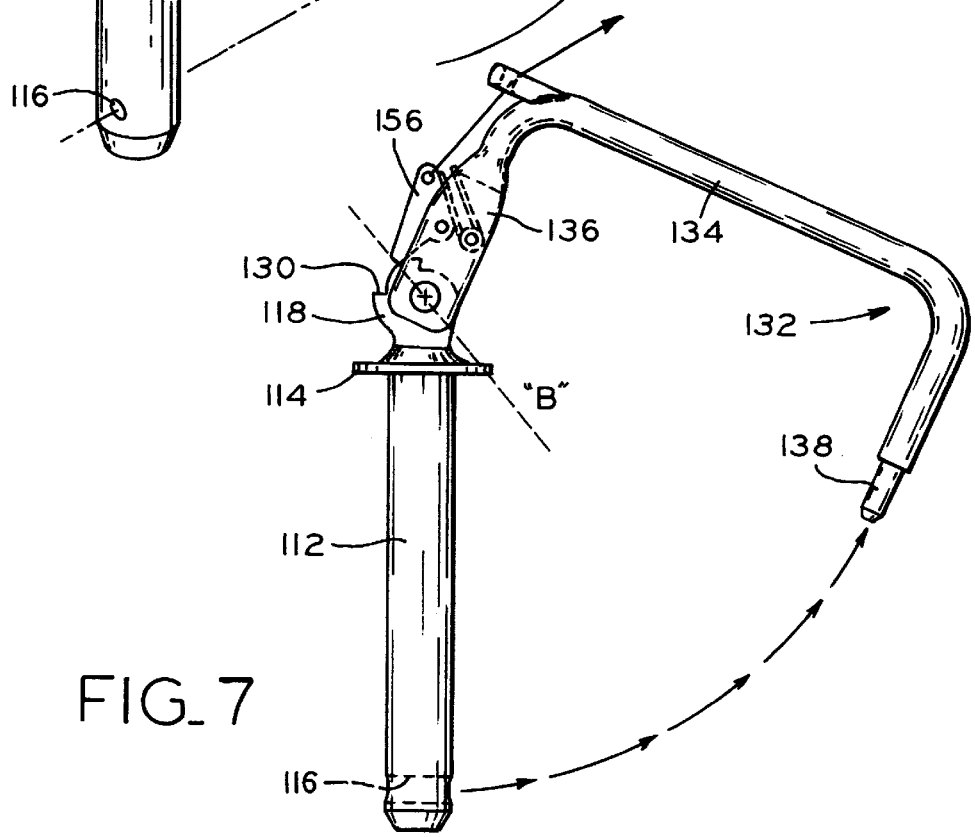

HITCH PIN WITH LOCKING LEVER

BACKGROUND OF THE INVENTION

1. Field of the Invention.

The present invention relates to hitch pins and in particular to an improved hitch pin to connect a farm implement to a drawbar of a towing vehicle.

2. Description of the Related Art.

Hitch pins are commonly used to connect a drawn vehicle to a towing vehicle. For example a farmer normally has a number of different implements which must be connected to the drawbar of a farm tractor. There are numerous designs of such pins for connecting a vehicle to a towing vehicle and preventing the pin from inadvertently falling out from the drawbar.

One particular hitch pin is relatively a simple and durable self-locking hitch pin that positively prevents the pin from inadvertently falling out of the connected members. U.S. Pat. No. 4,555,125 (patent '125) discloses an improved safety-lock hitch pin having a pin with a collar formed near its upper end and a transversely extending handle mounting member. A handle has a main body with a transversely extending opening through it to provide for pivotal mounting of the handle on the transverse member of the pin. A second opening in the main body of the handle contains a locking member biased by a spring into a locking position when the handle is lowered into a closed position with the lower end of the handle. From a closed and locked position, the locking member is manually depressed which allows the handle to pivot upwardly so that the pin can be removed. In the unlocked position, the handle provides for additional leverage for removal of a tight pin. However, it is more desirable to improve the ease of use and efficiency of manufacturing.

The hitch pin of patent '125 may be difficult to use in certain situations. First, from the closed and locked position, the locking member is manually pushed or depressed, typically, away and downwardly from the user. When a circumferential groove of the locking member is in alignment with the mounting member, the handle can be unlocked and pivoted through a limited arc. However, for some individuals, a seemingly large amount of force is required upon the point of contact on the locking member to unlock the hitch pin because of the limited amount of leverage that is provided to the user. Due to the relatively limited surface area for the point of contact provided on the locking member, some users may direct energy incorrectly on an angle, rather than directly thereon, leading to a relatively large amount of energy used and repeated attempts to unlock the hitch pin. For some individuals, the surface area upon which force is applied only allows for a small portion of, for example, the user's thumb or finger to support force to compress the spring. Additionally, the locking member, thus the spring, must be fully depressed for substantial alignment to unlock the handle. Otherwise, the end of the locking member will remain engaged with the groove of the mounting member, preventing the desired movement of the handle.

Next, when the locking member is depressed, the handle may be pivoted upwardly until the front surface of the main body engages with the collar of the pin; however, the handle may be pivoted upwardly only about 45 degrees until the surface engages with the collar stopping movement thereof. This sometimes provides difficulty to the user in connecting and disconnecting the drawn vehicle and the towing vehicle. Some drawbars or hitches may be positioned such that a greater angle of movement of the handle is desired for easier connection or disconnection of two vehicles. As a result, in order to connect the vehicles, the user is required to first insert the pin on an angle to clear the handle from any obstructions. In some circumstances, a 45-degree angle of movement may not provide adequate space to connect or disconnect the drawn vehicle and the towing vehicle.

It is desired to improve the manufacturing efficiency of the patent '125 hitch pin. First, the main body of the handle includes many internal cavities having precise measurements in order to properly receive the locking member. Thus, cast iron simply may not be used to manufacture the hitch pin disclosed in patent '125. Rather, more complex processes are necessary to create the bores and cavities within the main body, resulting in a greater amount of time spent manufacturing each item. This, in turn, results in higher costs.

Other pins have been designed which use a hasp that is inserted through an opening in the bottom of the pin after the connection is made. However, if the hasp is bumped or becomes caught on a corn stalk, for example, the hasp can be lost and the hitch pin can work its way out of the connection between the drawbar and the tongue of the drawn vehicle.

Some other hitch pins are provided with a self-contained over-center wedge in the bottom end of the pin which wedge by force of gravity will pivot to a transverse position at the bottom of the pin thus preventing the pin from being withdrawn unless the wedge is manually moved into an upright position. However, through use, the wedge can bounce back into the pin or it can become bent and, therefore, fail to drop into a locking position.

Other hitch pins have used wire spring yokes or chain yokes some with catches or padlocks. The wire spring yokes can become easily broken, particularly when used to provide extra leverage for removing a tight pin.

Thus, it is desired to provide an improved self-locking hitch pin that is easier to use and easier to manufacture, and yet positively prevents the pin from inadvertently falling out of the connected members. It is further desired to provide a hitch pin that is lower in costs and improves durability.

SUMMARY OF THE INVENTION

The present invention is a hitch pin having a locking lever. The hitch pin generally includes a pin with a collar formed near its upper end, a handle mounting member at the upper end extending upwardly from the collar, a pivot portion of a U-shaped handle pivotally connected to the handle mounting member by a crossbar, a latch portion of the U-shaped handle engaging the lower end of the pin, and a locking lever with a spring pivotally connected to the pivot portion. The locking lever has a nose end and a tail end, where the nose end engages with the handle mounting member in a locked position.

The present invention provides for the locking lever for easier use of the hitch pin. The tail end of the locking lever is pivoted inwardly and downwardly to release the latch portion of the U-shaped handle from the lower end of the pin. The spring which biases the locking lever in an upward position is tensioned by the torsional movement of the locking lever. The downward pivotal movement of the tail end causes the upward pivotal movement of the nose end such that the nose end disengages with the handle mounting member, allowing the handle to be unlocked from the pin and pivotally rotated about an axis.

Unlike prior hitch pins, the handle of the present invention may be rotated approximately 90 degrees about the handle mounting member before the nose end is stopped from further pivotal movement. The increased pivotal movement allows the user to insert the pin vertically or straight through a hitch without an angle rather than initially inserting the pin on an angle to clear the handle from any obstructions that would otherwise be present. Additionally, with the 90-degree rotation thereabout, more leverage is created for removing the pin from the hitch.

Unlike prior hitch pins, the hitch pin of the present invention provides for an easier release/unlock feature with the implementation of the locking lever. The design of the locking lever provides the user with more leverage when pushing inwardly and downwardly to unlock the hitch pin. The upper portion of the locking lever provides an adequate amount of surface area for the user to easily apply force thereupon and unlock the hitch pin. The user typically uses gripping action to force the locking lever inward and downward. Typically, the user presses against the locking lever while gripping the handle for leverage. This may be easily performed with one hand. Compared to prior hitch pins, the present invention allows the user to apply greater leverage, resulting in less effort required to unlock the hitch pin.

Additionally, unlike prior hitch pins, when the locking lever is pivotally moved downwardly, the locking lever is only required to clear a particular length of a top notch in order to unlock the hitch pin. That is, no substantial alignment between two members is necessary.

The present invention is easier to manufacture than prior hitch pins because all parts of the present invention may be made of cast iron. For example, one embodiment of the present invention includes a handle being a basic U-shaped member and having a simple pivot portion. The pivot portion includes basically two opposed flanges defining an open slot and having a transverse hole formed therethrough. A handle mounting member, to which the pivot portion connects, has a simple planar design with an aperture formed therethrough. Unlike prior hitch pins, the present invention is absent any internal cavities or complex designs. The members comprising the present invention are of simplistic designs as to allow manufacturing thereof by cast iron. A simple mold of the desired shapes without further drilling or further manufacturing processes is all that may be needed to make the hitch pin. This allows the hitch pin of the present invention to be manufactured in less time with more ease which, in turn, results in lower costs.

BRIEF DESCRIPTION OF THE DRAWINGS

The above mentioned and other features and objects of this invention, and the manner of attaining them, will become more apparent and the invention itself will be better understood by reference to the following description of the invention taken in conjunction with the accompanying drawings, wherein:

FIG. 1 is a perspective exploded view of a first embodiment of the present invention.

FIG. 2 is a side view of the first embodiment thereof in a locked position.

FIG. 3 is another side view of the first embodiment taken along line 3—3 of FIG. 2 viewed in the direction of the arrows illustrating the second embodiment.

FIG. 4 is a top view of the first embodiment taken along line 4—4 of FIG. 2 viewed in the direction of the arrows illustrating the second embodiment.

FIG. 5 is a side view of the first embodiment thereof in an unlocked position illustrating a pivoting axis A.

FIG. 6 is a perspective exploded view of a second embodiment of the present invention.

FIG. 7 is a side view of the second embodiment thereof in an unlocked position illustrating a pivoting axis B.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in two forms, and such exemplifications are not to be construed as limiting the scope of the invention in any manner.

DESCRIPTION OF THE PRESENT INVENTION

The embodiments disclosed below are not to be exhaustive or limit the invention to the precise forms disclosed in the following detailed description. Rather, the embodiments are chosen and described so that others skilled in the art may utilize their teachings.

Referring to FIGS. 1–5, hitch pin 10 includes pin 12 having collar 14 transversely extending near its upper end and lower bore 16 transversely formed near its lower end. Handle mounting member 18 at the upper end of pin 12 upwardly extends from collar 14, forming two opposing flanges 20,22 having flat vertical inner surfaces 24,26, respectively. The space between opposing flanges 20,22 defines slot 28. Opposing flanges 20,22 have respective transverse holes 30,32 formed therethrough aligned with each other. Flanges 20,22 further have peripheries 34,36 with notches 38,40 respectively formed at the top of each of flanges 20,22.

U-shaped handle 42 has hand gripping portion 44 and enlarged portion or pivot portion 46 formed at the upper end of hand gripping portion 44. Hand gripping portion 44 terminates in lower or latch portion 48 that inserts into lower bore 16 of pin 12 when handle 42 is in a locked position as shown in FIG. 2. Pivot portion 46 is preferably an enlarged elongated member having front surface 54 and flat vertical sides 50,52 through which aperture 56 is formed.

Handle 42 pivotally connects to handle mounting member 18 at upper end of pin 12. The thickness of slot 28 is slightly larger than the thickness of pivot portion 46 such that flanges 20,22 receive pivot portion 46, allowing sides 50,52 to face inner surfaces 24,26, respectively. Pivot portion 46 is positioned between flanges 20,22 such that aperture 56 is in alignment with holes 30,32. Crossbar 58 is disposed through aligned holes 30,32 and aperture 56, thus pivotally securing handle 42 to mounting member 18 and defining a pivoting axis A as shown in FIG. 5. Alternatively, crossbar 58 may be integrally formed in one of the pivotally connected components.

In accordance with the present invention, locking lever 60 having nose end 62, tail end 64, and top surface 66 pivotally attaches to pivot portion 46. Locking lever 60 rests on spring 68 such that tail end 64 is biased from pivoting downwardly. Spring 68 is disposed in notch 70 of pivot portion 46 and extends out to contact bottom surface of locking lever 60. Top surface 66 is disposed face-up. Locking lever 60 is a flat member preferably having a thickness that is greater than the thickness of slot 28, allowing the nose end 62 of locking lever 60 to rest upon flanges 20,22 and engage with notches 38,40. Locking lever 60 may be pivoted downwardly by applying pressure upon top surface 66, thus, against spring 68.

In the locking position, nose end 62 engages with notches 38, 40 of handle mounting member 18, thereby preventing handle 42 from being pivoted about axis A. When sufficient pressure is applied against spring 68, tail end 64 pivots downwardly such that nose end 62 clears notches 38,40 and may slide about peripheries 34,36 of handle mounting member 18, allowing pivot movement of handle 32 about the axis as shown in FIG. 5. In the unlocked position, at approximately 90 degrees from top notch 28, front surface 54 of pivot portion 46 engages with collar 14 of pin 12 to serve as a stop, preventing further pivotal movement from notches 38,40.

FIGS. 6 and 7 show a second embodiment of the invention where hitch pin 110 includes pin 112 having collar 114 transversely extending near its upper end and lower bore 116 transversely formed near its lower end. At the upper end of pin 112, handle mounting member 118 upwardly extends from collar 114, handle mounting member 118 having flat vertical outer surfaces 120,122 through which aperture 124 is formed. Handle mounting member 118 further has periphery 126 with transverse notches 128,130 formed at the top and side of periphery 126 approximately 90 degrees from each other.

U-shaped handle 132 has hand gripping portion 134 and enlarged portion or pivot portion 136 formed at the upper end of hand gripping portion 134. Hand gripping portion 134 terminates in lower or latch portion 138 that inserts into lower bore 116 of pin 112 when handle 132 is in a locked position. Pivot portion 136 is preferably an enlarge elongated member being two opposing flanges 142,144 having flat vertical inner surfaces 146,148 respectively. The space between opposing flanges 142,144 defines slot 140. Opposing flanges 142,144 have respective transverse holes 150, 152 formed therethrough aligned with each other.

Handle 132 pivotally connects to handle mounting member 118 at upper end of pin 112. The thickness of slot 140 is slightly larger than the thickness of handle mounting member 118 such that flanges 142,144 receive mounting member 118, allowing outer surfaces 120,122 to face inner surfaces 146,148, respectively. Handle mounting member 118 is positioned between flanges 142,144 such that side notch 130 is disposed near the end of pivot portion 136 and such that aperture 124 is in alignment with holes 150,152. Crossbar 154 is disposed through aligned holes 150,152 and aperture 124, thus, pivotally securing handle 132 to mounting member 118 and defining pivoting axis B as shown in FIG. 7. Alternatively, crossbar 154 may be integrally formed in one of the pivotally connected components.

In accordance with the present invention, locking lever 156 has nose end 158, tail end 160, and top surface 162, and also has a pivotal attachment to pivot portion 136. Spring 164 is disposed in notch 166 of pivot portion 136 and extends out to contact bottom surface of locking lever 156. Locking lever 156 is a flat member having a thickness that is slightly less than the thickness of slot 140, allowing locking lever 156 to be disposed between flanges 142,144. Locking lever 156 is disposed between flanges 142,144 such that nose end 158 engages with handle mounting member 118. Locking lever 156 rests on spring 164 such that tail end 160 is biased from pivoting downwardly. Top surface 162 faces upwardly. Locking lever 156 may be pivoted downwardly upon applying pressure against spring 164.

In the locking position, nose end 158 engages with top notch 128 of handle mounting member 118, thereby preventing handle 132 from being pivoted about axis B. When sufficient pressure is applied against spring 164, tail end 162 pivots downwardly such that nose end 158 clears top notch 128 and may slide about periphery 126 of the handle mounting member 118, allowing pivotal movement of handle 132 about axis B as shown in FIG. 7. In the unlocked position, at approximately 90 degrees from top notch 128, nose end 158 engages with side notch 130, serving as a stop and preventing further pivotal movement from top notch 128.

In use, the user will unlock the hitch pin by gripping the upper portion of the handle for leverage, and applying pressure upon the top surface of the locking lever against the spring, thereby clearing the nose end from top notch or notches. This may easily be performed with one or two hands because the top surface has a relatively large surface area and the point of contact includes a broad area on the top surface upon which the user may apply pressure. The latch portion of the handle is disengaged from the pin by pivoting the handle about the axis, thus, sliding the nose end about the periphery or peripheries of the mounting member. Once the latch portion is disengaged, the pin may be accordingly inserted through the desired hitch to connect the drawn and towing vehicle. The collar typically is rested on the frame of the hitch, preventing interference with the pivot portion and the mounting member. When the hitch pin is ready to be locked, the handle is pivoted back toward its locked position such that the latch portion of the handle inserts into the lower bore of the pin and the nose end engages with the top notch or notches. In removing the hitch pin from the hitch, the same manner of unlocking the hitch pin is performed. After unlocking the hitch pin and pivoting the handle, the user may use the hand gripping portion as extra leverage when removing the pin from the hitch.

As to manufacturing, the present invention may be made of cast iron alone rather than requiring further drilling or further manufacturing processes. The members comprising the present invention have streamlined designs that are easy to manufacture. The embodiments of the pivot portion and the handle mounting member, for example, have basic planar formations suitable for manufacturing by cast iron alone. The members only contain exterior formations and have no internal cavities which otherwise would require further drilling or manufacturing processes. The streamlined design of the present invention, thus, increases the efficiency of manufacturing which, in turn, leads to an overall lower cost of manufacturing.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hitch pin for connecting a towing vehicle to a towed vehicle, said hitch pin comprising:

a pin having an upper end and a lower end;

a handle having a pivot portion at its upper end and a latch portion at its lower end, said pivot portion and said latch portion adapted to engage said pin at said upper and lower ends, respectively;

a pivot coupling said pin upper end and said handle pivot portion; and a locking lever pivotally attached to said pivot portion and having a biasing member disposed between said locking lever and said pivot portion, said biasing member biasing said locking lever against said pin upper end to prevent pivoting by said handle in one of a locked unpivotable position and an unlocked pivotable position, whereby said locking lever engages said upper end of said pin and said lower portion engages with said lower end of said pin thereby defining the locked unpivotable position of said handle relative to said pin, and whereby said locking lever is capable of pivoting against said biasing member to clear said locking lever from said upper end of said pin thereby defining the unlocked pivotable position of said handle relative to said pin; wherein said pin further has a bore transversely formed near the lower end of said pin and further has a transverse collar near said pin upper end, whereby said lower portion is rigidly attached to said handle and inserts into said bore when in said locked position.

2. The hitch pin of claim 1 wherein said pivot portion includes a first transverse opening formed therethrough and said pin upper end has a second transverse opening formed therethrough and a top notch formed at the top of said pin upper end, said locking lever engaging said top notch when in said locked position.

3. The hitch pin of claim 2 wherein said pivot portion pivotally connects to said pin upper end at alignment of said first and second openings defining a pivoting axis about which said handle pivots from said pin.

4. The hitch pin of claim 3 further including a separate crossbar being disposed through aligned first and second openings pivotally securing said pivot portion to said pin upper end.

5. The hitch pin of claim 2 wherein said locking lever further has a nose end, a tail end, and a top surface, said nose end engaging with said top notch and said lower portion engaging with the lower end of said pin thereby further defining said locked unpivotable position, said tail end pivoting downwardly against said biasing member to clear said nose end from said top notch thereby further defining said unlocked pivotable position.

6. The hitch pin of claim 5 wherein said pin upper end further has a side notch formed at a side of said pin upper end.

7. The hitch pin of claim 6 wherein said nose end engages said side notch when said handle is pivoted from said pin in said unlocked position, said side notch thereby providing a stop for said unlocked pivotable position whereby said handle is secured in an open position which facilitates in the removal of said pin.

8. The hitch pin of claim 7 wherein said pivot portion further has two opposing flanges defining a slot, said flanges having flat inner surfaces.

9. The hitch pin of claim 8 wherein said pin upper end further has flat sides and a thickness slightly less than the thickness of said slot, said pivot portion pivotally connecting to said pin upper end such that said sides are disposed between said flanges, said sides respectively facing said inner surfaces and side notch being disposed away from said pivot portion.

10. The hitch pin of claim 5 wherein said pin upper end further has two opposing flanges defining a slot, said flanges having flat inner surfaces.

11. The hitch pin of claim 10 wherein said pivot portion further has flat sides and a thickness slightly less than the thickness of said slot, said pivot portion pivotally connecting to said pin upper end such that said sides are disposed between said flanges, said sides respectively facing said inner surfaces.

12. The hitch pin of claim 11 wherein said nose end has a length greater than the thickness of said slot, said nose end engaging said collar when said handle is pivoted from said pin in the unlocked position, thereby providing a stop and assisting the removal of said pin.

13. A hitch pin for connecting a towing vehicle to a towed vehicle, said hitch pin comprising:
a pin having a transverse collar near the upper end of said pin;
a handle mounting member extending upwardly from the upper end of said pin, said handle mounting member having a first transverse opening formed therethrough, said handle mounting member having a top notch formed at the top of said handle mounting member;
a handle having an enlarged portion at its upper end and a lower portion at its lower end, said enlarged portion including a second transverse opening formed therethrough, said enlarged portion pivotally connecting to said handle mounting member;
a biasing member attached to said enlarged portion; and
a locking lever pivotally attached to said enlarged portion and disposed against said biasing member, said locking lever further has a nose end, a tail end, and a top surface, said nose end engaging with said top notch and said lower portion engaging with the lower end of said pin thereby further defining said locked unpivotable position, said tail end pivoting downwardly against said biasing member to clear said nose end from said top notch thereby further defining said unlocked pivotable position, said biasing member biasing said locking lever to prevent pivoting downwardly;
wherein said enlarged portion pivotally connects to said handle mounting member at alignment of said first and second openings defining a pivoting axis, whereby said locking lever engages with said top notch and said lower portion engages with the lower end of said pin thereby defining a locked unpivotable position of said handle about said axis, and whereby said locking lever pivots against said biasing member to clear said locking lever from said top notch thereby defining an unlocked pivotable position of said handle about said axis; wherein said pin further has a bore transversely formed near the lower end of said pin, whereby said lower portion is rigidly attached to said handle and inserts into said bore when in said locked position.

14. The hitch pin of claim 13 further including a crossbar being disposed through aligned first and second openings pivotally securing said enlarged portion to said handle mounting member.

15. The hitch pin of claim 14 wherein said handle mounting member further has a side notch formed at a side of said handle mounting member.

16. The hitch pin of claim 15 wherein said nose end engages said side notch when said handle is pivoted from said pin in said unlocked position, said side notch thereby providing a stop and assisting in the removal of said pin.

17. The hitch pin of claim 16 wherein said enlarged portion further has two opposing flanges defining a slot, said flanges having flat inner surfaces.

18. The hitch pin of claim 17 wherein said handle mounting member further has flat sides and a thickness slightly less than the thickness of said slot, said enlarged portion pivotally connecting to said handle mounting member such that said sides are disposed between said flanges, said sides respectively facing said inner surfaces and side notch being disposed away from said enlarged portion.

19. The hitch pin of claim 14 wherein said handle mounting member further has two opposing flanges defining a slot, said flanges having flat inner surfaces.

20. The hitch pin of claim 19 wherein said enlarged portion further has flat sides and a thickness slightly less than the thickness of said slot, said enlarged portion pivotally connecting to said handle mounting member such that said sides are disposed between said flanges, said sides respectively facing said inner surfaces.

21. The hitch pin of claim 20 wherein said nose end has a length greater than the thickness of said slot, said nose end engaging said collar when said handle is pivoted from said pin in the unlocked position, thereby providing a stop and assisting the removal of said pin.

* * * * *